2,955,148

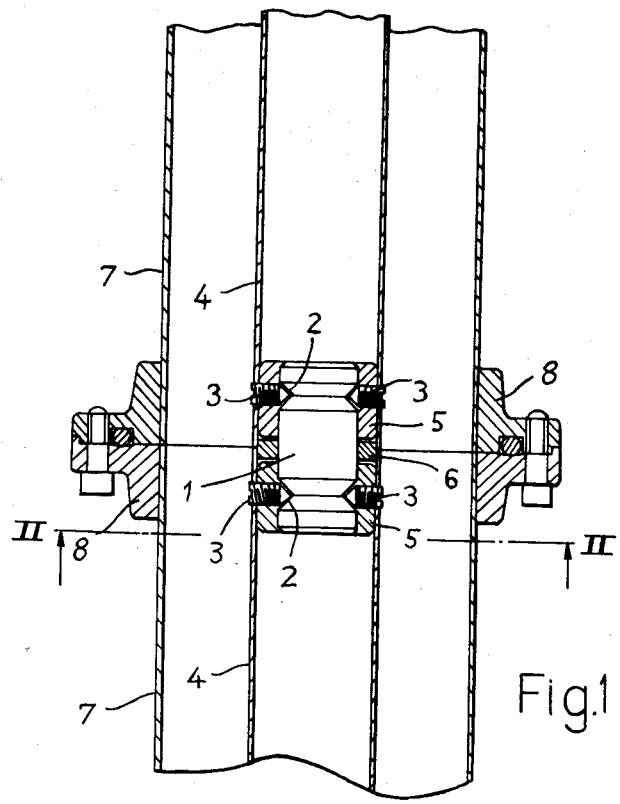
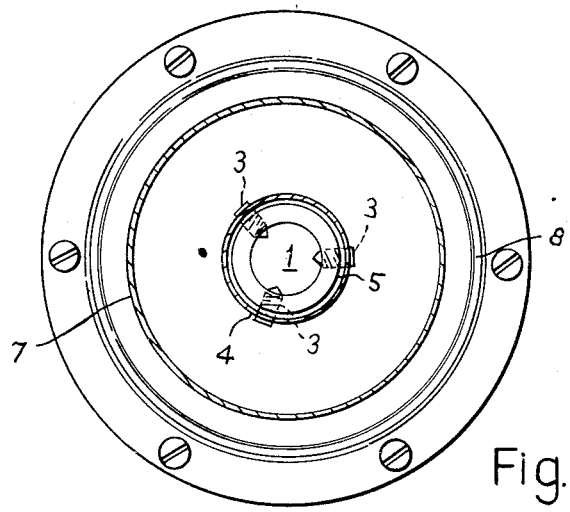

COUPLING FOR TRANSMISSION LINES

Peter E. Graham and Alan Bone, Cambridge, England, assignors to Pye Limited, Cambridge, England, a British company Filed July 5, 1957, Ser. No. 670,076

Claims priority, application Great Britain July 10, 1956

6 Claims. (Cl. 174—88)

The present invention relates to a coupling for transmission lines particularly for coupling together centre conductors of sections of V.H.F. co-axial transmission lines.

According to the invention, a coupling comprises a member the opposite ends of which are respectively arranged to be located and secured within the adjoining ends of adjacent tubular sections of a transmission line to be coupled together, said member being provided with means adjacent to at least one end which, in cooperation with a fastening device, allow the adjoining end faces of the adjacent tubular sections to be drawn into physical and electrical contact as the member is secured to the tubular section at least at that end.

The inner conductors of co-axial transmission lines are generally of circular cross-section in which case the coupling member may be of generally cylindrical form. Preferably the coupling member is made of conducting material such as brass.

In order that the invention may be more fully understood, reference will now be made to the accompanying drawing, which shows the inner conductors of two adjacent sections of a co-axial transmission line connected together by a coupling arrangement according to this invention, and in which:

Figure 1 is a longitudinal section, and
Figure 2 is a cross-section on the line II—II in Figure 1.

Referring to the drawing, the coupling member comprises a cylindrical brass member 1, having a substantially V-shaped annular groove 2 formed around the periphery of the member adjacent each end, each of said grooves being adapted to receive the points of one or more cone-pointed set screws 3, screwed into prepared holes in the inner tubular conductors 4 to be connected together. The screws holes are formed in the adjoining ends of adjacent conductor sections which receive the ends of the cylindrical member 1 so that the groove 2 at each end is positioned to receive the points of the set screws 3. Three or four set screws may be provided for each groove arranged equidistantly around the periphery of the inner conductor. The tightening of the set screws serves to draw the adjoining machined end faces of the inner conductors into close physical and electrical contact due to the relative movement between the points of the set screws and the side of the associated V-shaped groove. The centre-to-centre spacing between the screws along the longitudinal axis of the coupling member is arranged to be slightly greater than the spacing between the bottom of the grooves. For example, the spacing between the set screws may be 1.05 ins. and the spacing between the bottom of the grooves 1 inch. As shown in the drawing, an annular collar 5, for example of brass, may be secured within the end of each tubular inner conductor for example by brazing, and this member may be drilled and tapped to receive the set screws. The ends of the coupling member are then received within the central bore of the collars brazed into adjacent ends of adjoining sections of inner conductors 4. Preferably a locating member in the form of a ring 6 is arranged around the central portion of the coupling member and is of such dimensions that the outer surface of this ring is a good close fit within the inside of the tubular conductors. This locating ring is accommodated partly within the end of each adjoining conductor section and serves to keep the conductors in alignment with each other and prevent lateral movement therebetween. It is made somewhat thinner than the axial spacing between the collars secured in the inner conductors when they are secured together whereby it does not interfere in any way with the longitudinal movement of the tubes. The outer conductors of the transmission line sections are shown at 7 connected together by means of bolted annular flanges 8.

In an alternative construction, one end of the coupling member is provided with a substantial V-shaped annular groove and the other end, which may be of larger diameter, is formed so as to closely fit within one of the inner tubular conductors, for example by brazing, thus doing away with the necessity for the set screws and the collar within that inner conductor. The adjoining end faces of two adjacent inner conductor sections are drawn into electrical and physical contact by tightening the set screws in the other conductor section. A shoulder may be formed between the plain end of the coupling member of larger diameter brazed in the one conductor section, and the smaller diameter grooved end secured within a collar in the adjacent conductor section. With such construction, the locating ring may be omitted, since the larger diameter part of the coupling member is itself a close fit within the inner conductor and may in fact be partly received within the adjoining ends of both conductors thereby preventing lateral play between them. This construction can only conveniently be used when the sections of the co-axial transmission line are to be joined in a predetermined sequence and the necessary access is available for tightening up the screws.

The coupling according to the invention provides the advantages of single contact between adjacent inner conductors which is made close to the outer surface thereof. Also the conductors are locked together and cannot slip apart under conditions of strain, such as thermal contraction.

Whilst particular embodiments have been described, it will be understood that various modifications may be made without departing from the scope of this invention. For example, instead of making the coupling member cylindrical, even where it has to fit within a cylindrical bore in an inner tubular conductor or collar, it may be made polygonal or be provided with an outer surface having a ribbed or fluted form. Furthermore, the grooves need not be V-shaped provided that they are formed with an inclined portion so that insertion and tightening of the screws or other fastening means draws the adjoining end faces of adjacent tube sections into physical and electrical contact. It will also be appreciated that grooves need not be provided extending entirely around the periphery of the coupling member, but a plurality of separate grooves or cavities may be formed each of which only extends over a small arc of the periphery of the coupling member and receives the point of one set screw.

We claim:

1. A co-axial transmission line having an outer tubular conductor and an inner tubular conductor concentric with said outer conductor, said transmission line comprising at least two sections having adjacent ends to be connected together in direct physical and electrical contact, means for connecting together the adjacent ends of the outer conductor sections, and a coupling for connecting together the adjacent ends of the inner conductors sections and drawing them into direct contact with each other, said coupling comprising a generally cylindrical member of smaller diameter than the inner diameter of said inner conductor, the opposite ends of which slide axially within the adjacent ends of said inner conductor sections and means for securing said member to said adjacent ends of said inner conductor sections including a plurality of taper-ended screws equally circumferentially spaced near at least one of said adjacent ends of said inner conductor sections, said screws extending through said conductor and the tapered ends of said screws engaging in peripheral indented portions on said member with a wedging action to draw said adjacent ends of said inner conductor sections axially into direct physical and electrical contact.

2. A co-axial transmission line having an outer tubular conductor and an inner tubular conductor concentric with said outer conductor, said transmission line comprising at least two sections having adjacent ends to be connected together in direct physical and electrical contact, means for connecting together the adjacent ends of the outer conductor sections, and a coupling for connecting together the adjacent ends of the inner conductors sections and drawing them into direct contact with each other, said coupling comprising a generally cylindrical member of smaller diameter than the inner diameter of said inner conductor, the opposite ends of which slide axially within the adjacent ends of said inner conductor sections and means for securing said member to said adjacent ends of said inner conductor sections including a plurality of taper-ended screws equally circumferentially spaced near both of said adjacent ends of said inner conductor sections, said screws extending through said conductor and the tapered ends of said screws engaging in peripheral indented portions on said member with a wedging action to draw said adjacent ends of said inner conductor sections axially into direct physical and electrical contact.

3. A co-axial transmission line having an outer tubular conductor and an inner tubular conductor concentric with said outer conductor, said transmission line comprising at least two sections having adjacent ends to be connected together in direct physical and electrical contact, means for connecting together the adjacent ends of the outer conductor sections, and a coupling for connecting together the adjacent ends of the inner conductors sections and drawing them into direct contact with each other, said coupling comprising a generally cylindrical member of smaller diameter than the inner diameter of said inner conductor, the opposite ends of which slide axially within annular collars disposed in the adjacent ends of said inner conductor sections and means for securing said member to said adjacent ends of said inner conductor sections including a plurality of taper-ended screws equally circumferentially spaced near both of said adjacent ends of said inner conductor sections, said screws extending through said conductors and said collars and the tapered ends of said screws engaging in peripheral indented portions on said member with a wedging action to draw said adjacent ends of said inner conductor sections axially into direct physical and electrical contact.

4. A co-axial transmission line having an outer tubular conductor and an inner tubular conductor concentric with said outer conductor, said transmission line comprising at least two sections having adjacent ends to be connected together in direct physical and electrical contact, means for connecting together the adjacent ends of the outer conductor sections, and a coupling for connecting together the adjacent ends of the inner conductors sections and drawing them into direct contact with each other, said coupling comprising a generally cylindrical member of smaller diameter than the inner diameter of said inner conductor, the opposite ends of which slide axially within annular collars disposed in the adjacent ends of said inner conductor sections and means for securing said member to said adjacent ends of said inner conductor sections including at least three taper-ended screws equally circumferentially spaced near both of said adjacent ends of said inner conductor sections, said screws extending through said conductors and said collars and the tapered ends of said screws engaging in peripheral V-shaped grooves near opposite ends of said member with a wedging action to draw said adjacent ends of said inner conductor sections axially into direct physical and electrical contact.

5. The combination as claimed in claim 4, in which a locating member in the form of a ring is arranged around the central portion of the cylindrical coupling member and is of such dimensions that the outer surface of this ring is a close fit within the adjacent ends of the tubular inner conductor sections of transmission line to be coupled together.

6. A co-axial transmission line having an outer tubular conductor and an inner tubular conductor concentric with said outer conductor, said transmission line comprising at least two sections having adjacent ends to be connected together in direct physical and electrical contact, means for connecting together the adjacent ends of the outer conductor sections, and a coupling for connecting together the adjacent ends of the inner conductors sections and drawing them into direct contact with each other, said coupling comprising a generally cylindrical member of smaller diameter than the inner diameter of said inner conductor, the opposite ends of which slide axially within the adjacent ends of said inner conductor sections and means for securing said member to said adjacent ends of said inner conductor sections including at least three taper-ended screws equally circumferentially spaced near at least one of said adjacent ends of said inner conductor sections, said screws extending through said conductor and the tapered ends of said screws engaging in peripheral V-shaped portions on said member with a wedging action to draw said adjacent ends of said inner conductor sections axially into direct physical and electrical contact.

References Cited in the file of this patent

UNITED STATES PATENTS

| 1,533,875 | McCleary | Apr. 14, 1925 |
| 2,052,394 | Fullman | Aug. 25, 1936 |
| 2,153,527 | Batterman | Apr. 4, 1939 |
| 2,209,152 | Daniels | July 23, 1940 |
| 2,860,311 | Balian | Nov. 11, 1958 |

FOREIGN PATENTS

| 21,558 | Norway | July 10, 1911 |
| 941,205 | Germany | Apr. 5, 1956 |